United States Patent [19]

Lawrence et al.

[11] Patent Number: 5,172,547

[45] Date of Patent: Dec. 22, 1992

[54] ELECTRONIC VALVE CONTROL FOR GAS GENERATOR OUTFLOW

[75] Inventors: William J. Lawrence; John A. Stolan, both of San Jose; Steven O. Leisch, Morgan Hill, all of Calif.

[73] Assignee: The United States of America as represented by the Secretary of the Air Force, Washington, D.C.

[21] Appl. No.: 693,464

[22] Filed: Apr. 30, 1991

[51] Int. Cl.$^5$ .............................................. F02K 9/26
[52] U.S. Cl. ........................................ 60/234; 60/251
[58] Field of Search .................. 60/234, 245, 251, 253, 60/254; 137/487, 503

[56] References Cited

U.S. PATENT DOCUMENTS

| | | | |
|---|---|---|---|
| H747 | 2/1990 | Jacobs et al. | 60/254 |
| 4,091,732 | 5/1978 | Schadow | 102/49.3 |
| 4,133,173 | 1/1979 | Schadow | 60/204 |
| 4,165,608 | 8/1979 | Diesinger | 60/245 |
| 4,355,663 | 10/1982 | Burkes, Jr. et al. | 138/44 |
| 4,416,112 | 11/1983 | Johnson | 60/251 |
| 4,442,669 | 4/1984 | Burkes, Jr. et al. | 60/251 |
| 4,444,006 | 4/1984 | Burkes, Jr. et al. | 60/251 |
| 4,483,139 | 11/1984 | Engl | 60/251 |
| 4,574,586 | 3/1986 | Gabrysch | 60/254 |
| 4,590,860 | 5/1986 | Kromrey | 102/289 |
| 4,745,740 | 5/1988 | Dunn et al. | 60/234 |

Primary Examiner—Louis J. Casaregola
Attorney, Agent, or Firm—Thomas C. Stover; Donald J. Singer

[57] ABSTRACT

A controlled fuel flow system from variable flow solid fuel gas generator to secondary combustor is provided, which system includes a hot gas valve which is operated by an electronic controller. The valve is mounted between the gas generator and the secondary combustor, which valve has in the throat thereof a pivotable blade that moves to relatively blocking and unblocking positions therein and a nozzle downstream of such blade which communicates with the secondary combustor. A first pressure transducer is mounted in the gas generator and a second pressure transducer is mounted downstream of such blade near or in the nozzle. Actuator means are also provided to pivot such blade between relatively blocked and unblocked settings as guided by electronic gas flow controller logic. The secondary combustor has one or more air ducts therein and the above system is mounted, e.g., in a variable flow ducted rocket. In operation a fuel flow command is read by such logic which reads the above two pressure transducers and the valve blade position and then rotates such blade in the valve throat to throttle the hot gas therethrough toward the commanded fuel flow in a multi-read-adjust process and repeats the above sequence pursuant to such fuel flow commands to propel the rocket as directed.

12 Claims, 8 Drawing Sheets

ELECTRONIC VALVE CONTROL FOR GAS GENERATOR OUTFLOW

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to regulating the gas flow between a solid fuel gas generator and a combustor particularly by interposing an electronic valve control therebetween.

2. The Prior Art

Uncontrolled solid fuel gas generators experience significant variation in fuel flow rate due to thermal effects, progressive burning and throat deposition (in the outlet valve). This becomes a problem e.g. in rocket propulsion where one has a solid fuel gas generator in series with an outlet flow valve connected in turn, to a ducted (secondary) combustor or mounted in a rocket housing wherein the hot gas from the gas generator, mixes with an in-flowing oxidant such as air, burns and jets out of a nozzle aft in said housing to provide thrust for such rocket. In such case it is important to have a constant (rather than irregular) gas flow into the combustor for constant and predictable rocket propulsion. Conversely, it is often desired to vary the rocket's altitude and speed at certain points in its trajectory and it is therefore desirable to be able to vary the gas flow to the combustor and thus the propulsion of such rocket, in a controlled, predictable manner when desired.

To obtain the full potential performance of ducted rockets it is necessary to be able to regulate the fuel mass flow from gas generator to combustor. Unfortunately, there has been no simple way to directly measure the flow rate of the hot gases from gas generator to combustor. Attempts have been made in the prior art to indirectly measure and control such gas flow to combustors. Thus U.S. Pat. No. 4,355,663 (1982), U.S. Pat. No. 4,442,669 (1984) and U.S. Pat. No. 4,444,006 (1984), all to W. M. Burkes Jr. et al, relate to a nozzle/valve device for a ducted rocket motor in which a nozzle throat blockage element is moved into and out of such throat to vary gas flow therethrough from gas generator to combustor. These references teach the positioning of one pressure sensor, upstream of the blockage element, e.g., in the outlet of the gas generator thereto, which sensor is read by a logic circuit which operates the blockage element to control the gas flow through the throat to the combustor. However, such system relies on equations taking into account the known cross-sectional area of the throat, but doesn't take into account changes in such throat area when fuel deposits build up thereon, e.g., downstream of the pressure sensor so that the fuel flow data operating the logic and thus the fuel flow rate through the valve throat, becomes increasingly inaccurate with deposit build-up. Accordingly, the above three references disclose a system with one upstream pressure sensor that operates with crude fuel flow estimates so that an aerospace vehicle may not fly accurately and with a substantial loss of performance.

U.S. Pat. No. 4,574,586 to Gabrysch (1986) employs a nozzle valve throat blockage element between a gas generator upstream and a (secondary) combustor downstream, which choke operates in response to a temperature probe in the solid fuel grain of the gas generator to maintain the gas flow rate through such throat constant. Again, as fuel deposits build up in such throat, the choke reacts to progressively cruder fuel flow rate estimates.

Accordingly, there is a need and market for a fuel flow control valve that is accurate and durable and otherwise overcomes the above prior art shortcomings.

There has now been discovered a reliable control valve for a gas generator that accurately reads fuel flow therethrough even when fuel deposits occur in the throat thereof, to provide accurately controlled fuel flow to a secondary combustor, which flow can be held constant or varied as desired.

SUMMARY

Broadly, the present invention provides a controlled fuel flow system from gas generator to secondary combustor comprising, a valve mounted between the gas generator and the secondary combustor, the valve having a throat therethrough and a blockage element mounted in the valve and moveable in the throat between relatively blocked and unblocked positions to control the gas flow therethrough, pressure sensor means to read the gas pressure in the system upstream of the blockage element and downstream thereof, actuator means to position the blockage element between relatively blocked and unblocked settings and fuel flow controller logic to read the pressure sensors and to operate the actuator and the blockage element to adjust the gas flow through the valve to the secondary combustor toward a desired rate and to repeat such read-adjust cycle.

In another embodiment the controlled fuel flow system of the invention provides fuel flow controller logic to read the pressure sensors and determine the fuel flow rate through such valve and compare same with the desired flow rate or flow command and further to read the then position of such blockage element in a four-step reading process and then to operate the actuator to position such blockage element or valve blade to a desired setting so as to adjust the fuel flow rate to a desired rate and repeating such four-step read cycle to monitor such flow rate and to adjust same as desired.

By "combustor" or "secondary combustor", as used herein, is meant secondary combustor as the primary combustor is in the gas generator.

BRIEF DESCRIPTION OF THE DRAWINGS

The invention will become more apparent from the following detailed, specification and drawings in which.

DESCRIPTION OF PREFERRED EMBODIMENTS

Figure 1:
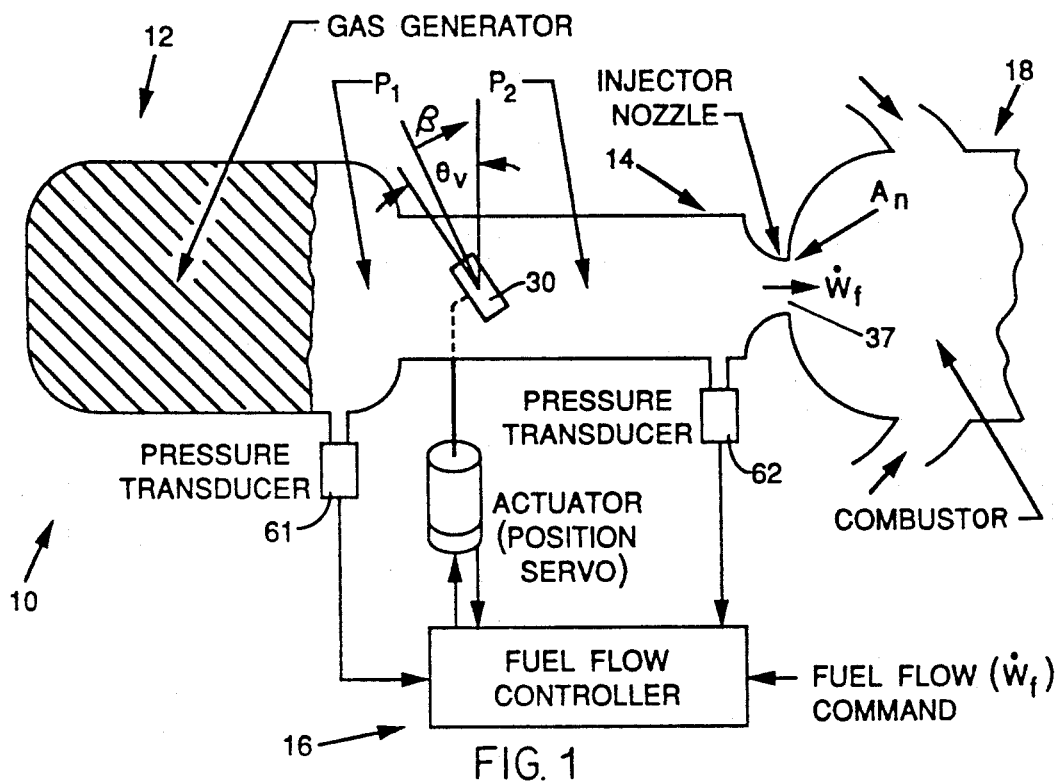
FIG. 1, is a schematic elevation view of the controlled fuel flow system embodying the present invention.

Referring in more detail to the drawings, as shown in schematic in FIG. 1, the controlled fuel flow system 10 embodying the invention has a solid fuel gas generator 12 and a variable opening valve 14, controlled by a fuel flow controller 16, which controls the flow to a ducted secondary combustor 18.

Figure 2:
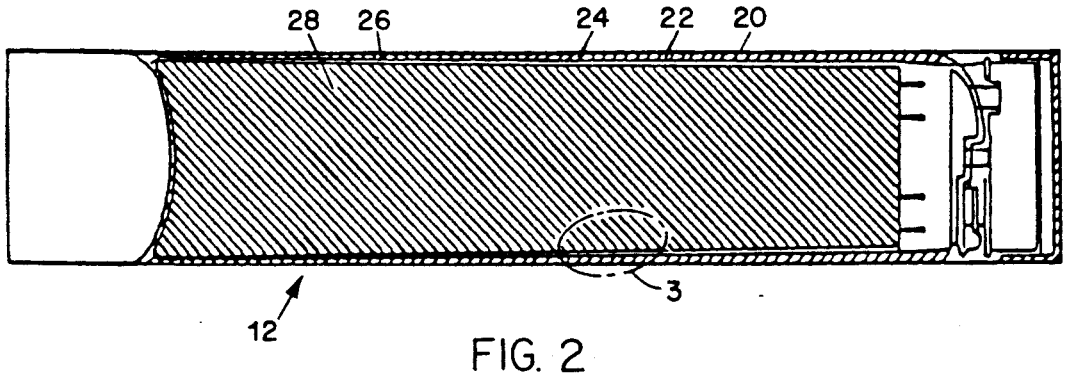
FIG. 2 is a sectional elevation view of a gas generator embodying the present invention.
Figure 3:
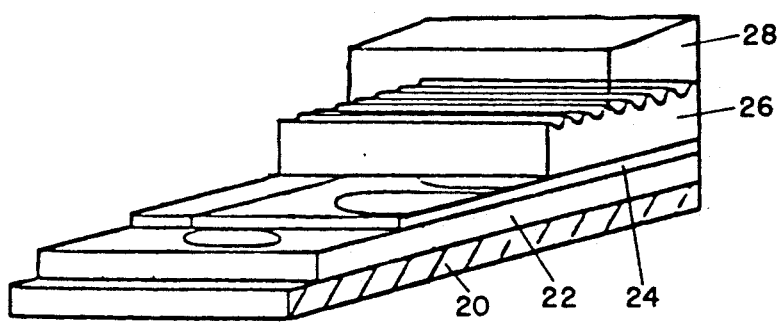
FIG. 3 is an enlarged fragmentary perspective view of a portion of the gas generator embodiment shown in FIG. 2.

As shown in FIGS. 2 and 3 the gas generator has a metallic case 20, a layer 22 of EPDM insulation, EPDM flex (stress relieving) layer 24, corrugated EPDM liner 26 and solid fuel propellant grain 28. Also present is an ignitor means for such solid fuel propellant grain (not shown in FIG. 2).

The above flex layer 24 provides stress relief for the end-burning propellant grain that is subject to high shear loading. The corrugated liner provides compensation for the "coning" effect on propellant burn area that is a well-known problem with end-burning grains. For discussion of such compensation see U.S. Pat. No. 4,590,860, cited above, which is incorporated herein by reference.

Figure 4:
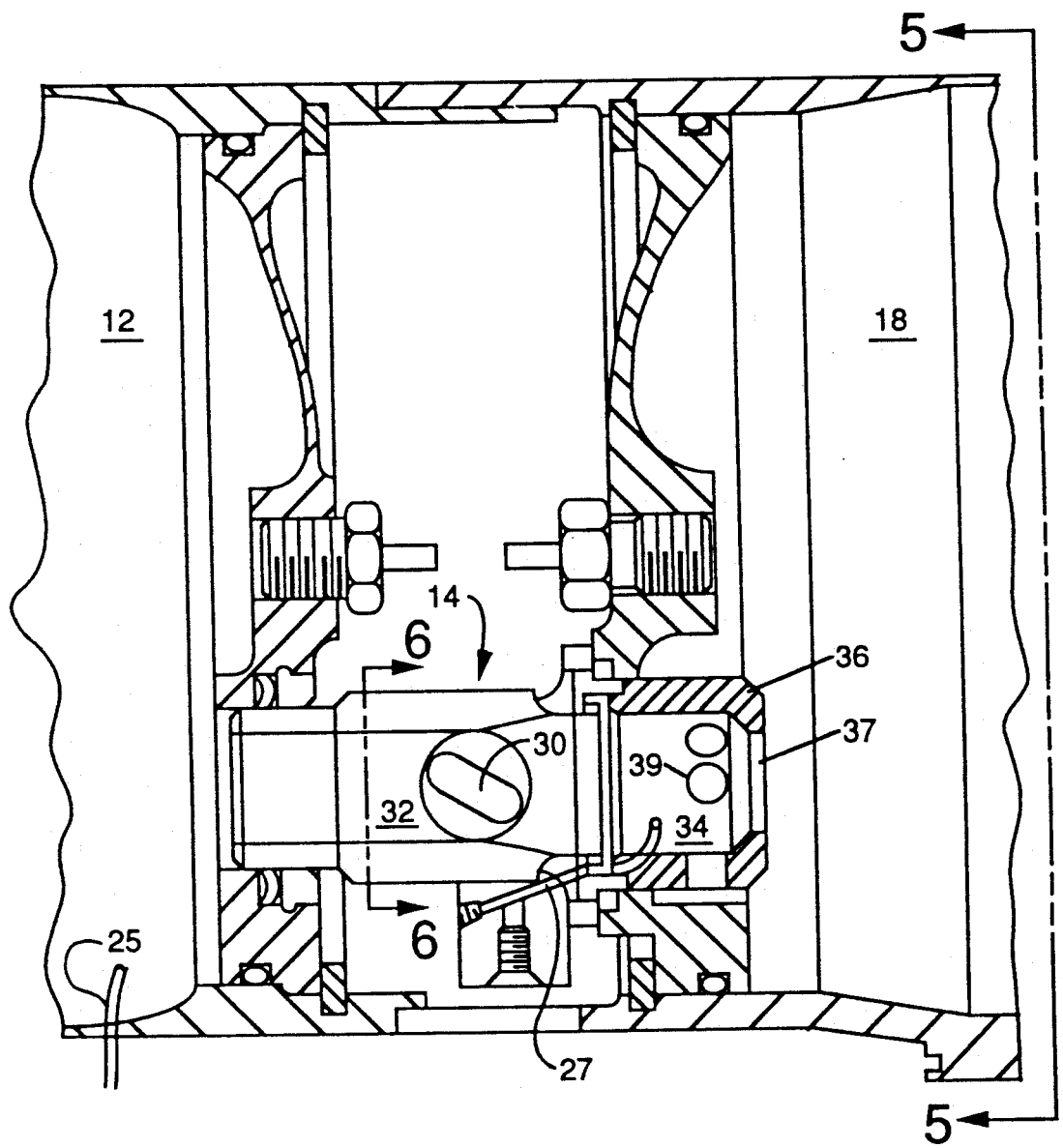
FIG. 4 is a fragmentary sectional elevation view of a hot gas valve embodying the present invention.

The hot gas valve 14 of the invention is positioned between gas generator 12 and secondary combustor 18 and connects the two, as shown in FIG. 4.

Figure 7:
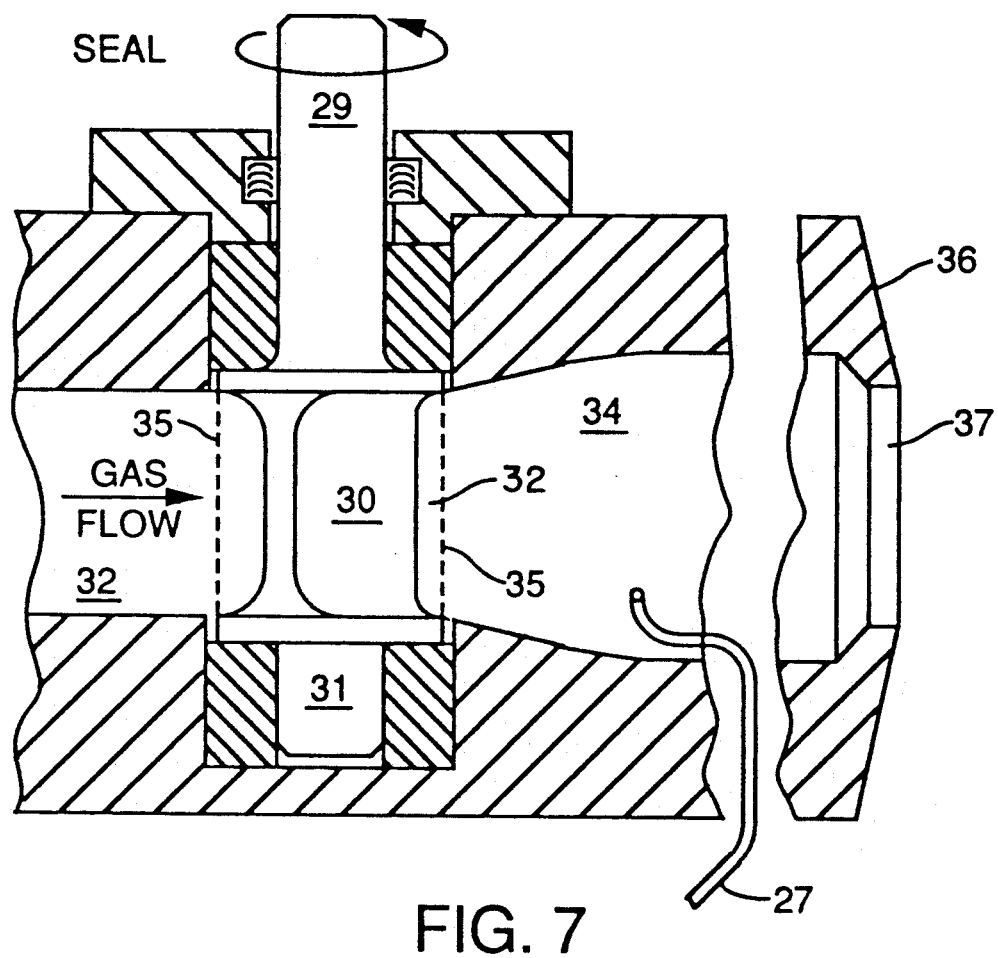
FIG. 7 is a top cross-sectional plan view of a portion of the hot gas valve embodiment shown in FIG. 6, taken on lines 7—7, looking in the direction of the arrows.

The valve 14 includes blade 30 mounted in throat 32 which widens to exit throat 34 in nozzle 36 before tapering to exit port 37 of such nozzle as shown in FIGS. 7 and 4. The nozzle 36 has several outlet ducts 39 behind the nozzle outlet port 37, as shown in FIGS. 4 and 5.

Figure 6:
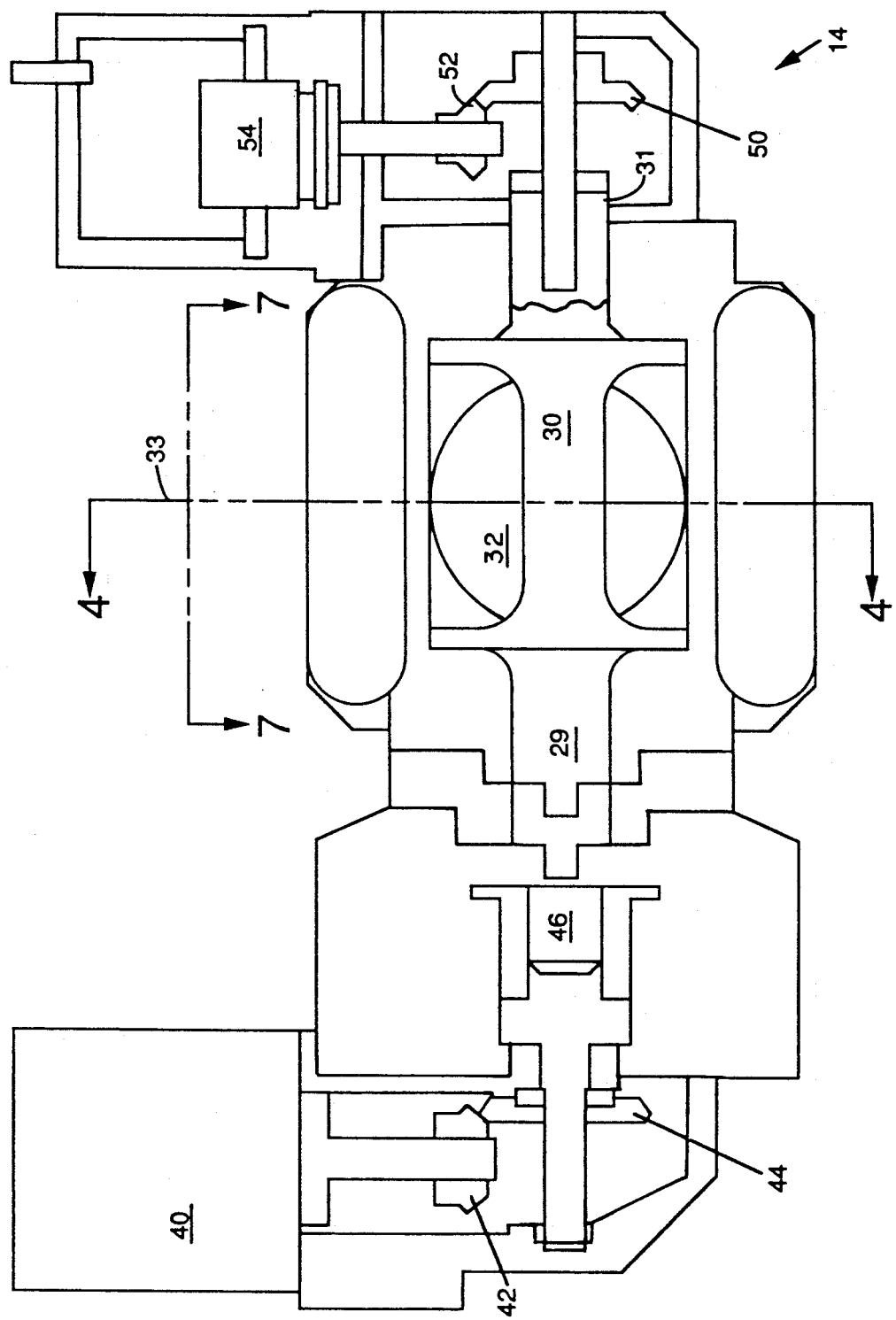
FIG. 6 is a side cross-sectional elevation view of the hot gas valve of the invention shown in the embodiment in FIG. 4 taken on lines 6—6, looking in the direction of the arrows.

The hot gas throttle valve 14 is shown in cross-section in FIG. 6. If such valve 14 be sliced along the line 33 thereof and the left-hand valve section be rotated 90° so as to bring the line 33 edge up out of the drawing, at right angles thereto, you then have the correct orientation of the valve assembly 14, including the blade 30 to the nozzle 36 and remaining valve components, as shown in FIG. 4.

Figure 5:
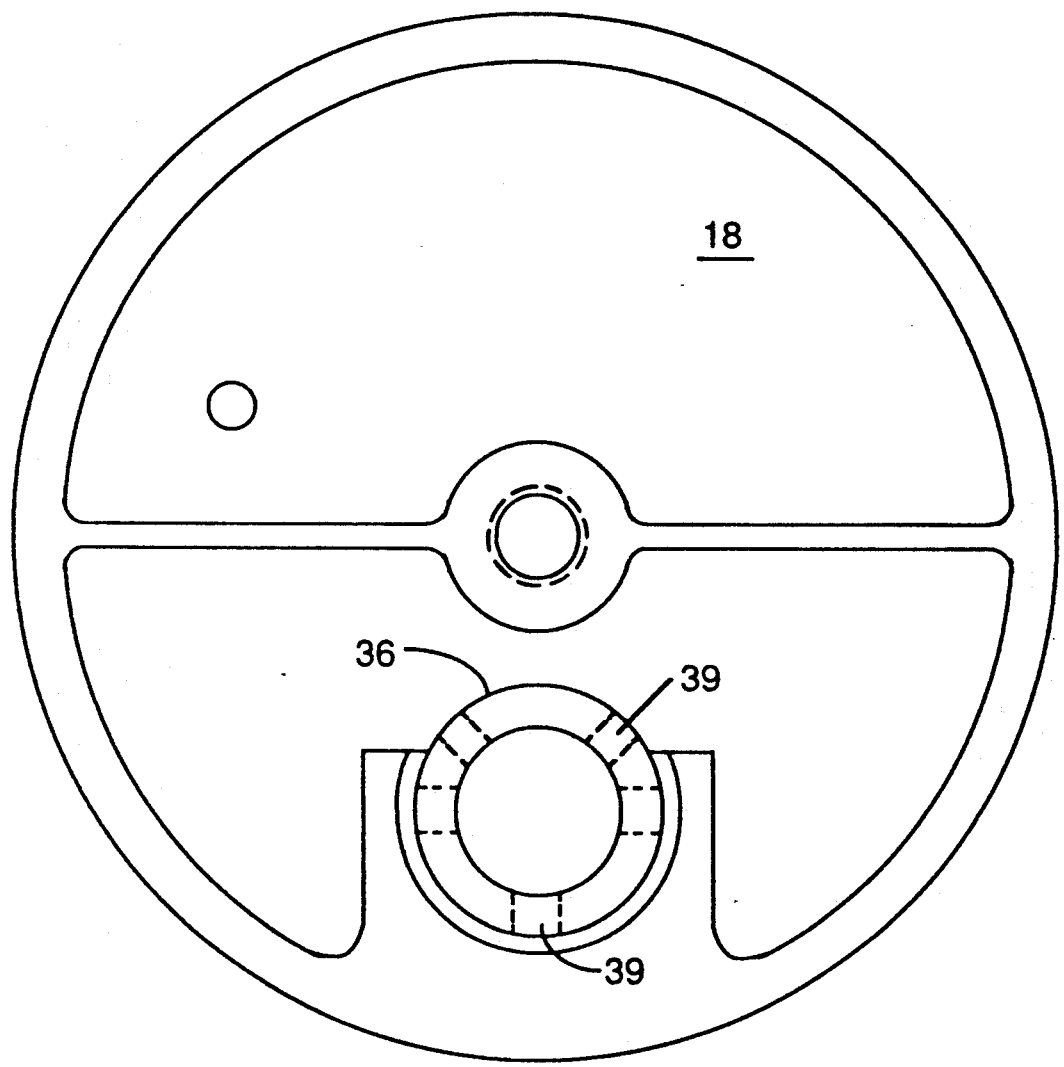
FIG. 5 is a cross-sectional elevation view of a portion of the valve embodiment shown in FIG. 4 taken on lines 5—5, looking in the direction of the arrows.

As shown in FIG. 6, such valve assembly 14 includes electro-mechanical components including an electrical rotary torque actuator motor 40 which, by way of bevel gears 42 and 44, powers or rotates harmonic drive 46, which acts as a 100:1 reduction gear to rotate axial blade shaft 29 and thus valve blade 30 through at least 90° from open (horizontal) to closed (vertical), as shown in FIG. 6 and indicated in FIGS. 5 and 7. The blade 30 is sized to provide clearance in the throat 32, even when closed, to provide passage therearound to the secondary combustor 18 and thus prevent build-up of excessive gas pressures in the gas generator 13.

On the other side of such blade 30 extends another axial shaft 31, which connects by bevel gears 50 and 52, to a valve position sensor 54 (a potentiometer), as indicated in FIG. 6.

Thus the valve 30 can be positioned in the open or closed position or various intermediate positions by actuator motor 40 and such position be sensed by position sensor 54, as shown in FIG. 6. In the overhead view provided in FIG. 7, the blade 30 is shown in the closed position whereas the dotted lines 35 show the blade 30 in the open position.

Again, referring to FIG. 7, it can be seen that the throat 32 downstream of the blade 30 flares out to a greater width 34 in the nozzle 36 before tapering down to a smaller outlet port 37, as shown in such figure. This is to provide a reduced gas velocity (eg. below Mach I) before entering the tapering nozzle discharge port 37 so that an accurate mass flow calculation can be made from the P2 measurement taken, eg. at the location shown in FIGS. 1 and 7.

In a preferred embodiment, P1 is measured by pressure transducer 25 inserted in the gas generator 12, as shown in FIG. 4 and P2 is measured by a pressure transducer 27, located in the gas valve nozzle 36, as shown in FIGS. 4 and 7.

As indicated in FIGS. 6 and 7, the blade is a rotary valve blade which is rotated to various settings as described above to control the valve area opening. However, in contrast to valves of other systems, the hot gas valve of the invention increases mass flow by decreasing the valve flow area in this type of system. That is, the reduced valve area causes the gas generator operating pressure to increase and driven by the high pressure therein, the burner rate increases, resulting in an increased gas flow.

Operating in this manner, the hot gas valve of the invention produces an initial "reverse flow" effect on the desired mass flow rate. Thus when an increased mass flow is commanded of the fuel flow controller 16 in FIG. 1, the valve flow area must be reduced, causing an initially lower mass flow until the gas generator propellant burn rate begins to increase at the higher pressure, bringing about the desired higher mass flow. The "reverse flow" effect also occurs when a mass flow decrease is commanded by such controller. Thus the fuel flow controller, e.g. 16 of the invention, must provide compensation to minimize the "reverse-flow" transients inherent in this system.

Figure 8:
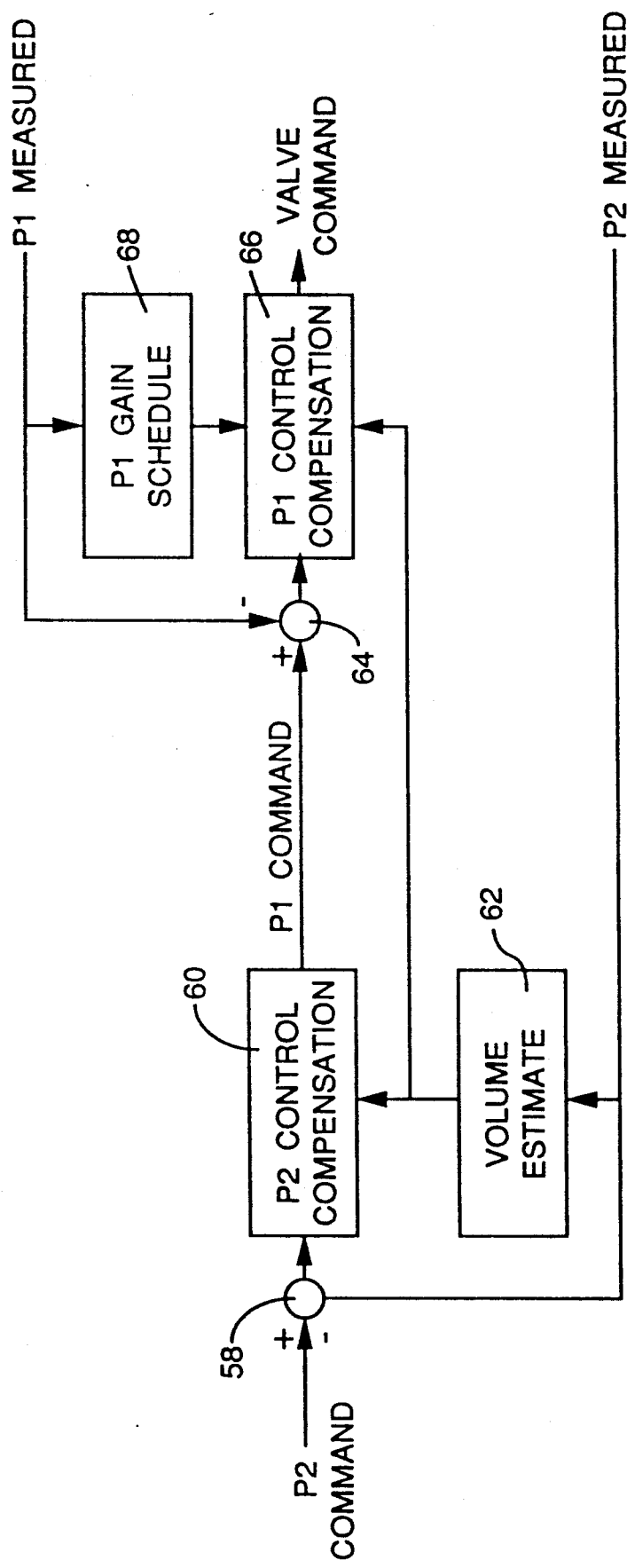
FIG. 8 is a schematic view of logic employed in operating the controlled fuel flow system embodying the present invention.

The schematic for the selected electronic controller 16 of FIG. 1, is shown in more detail in FIG. 8. The electronic fuel controller 16 (FIG. 1) uses both gas generated chamber pressure (P1) and fuel injector pressure (P2) as feedback control signals to produce the desired mass flow rate. The P2 pressure sensor is placed, as indicated in FIGS. 1 and 7, in a callibrated nozzle (such as nozzle 36) that permits accurate flow rate measurement. The electronic controller includes variable compensation gains to minimize "reverse-flow" transients.

In operation, per the schematic of FIG. 1, the fuel flow controller 16 reads the fuel flow command, reads the pressure transducer 61 in the gas generator 12 and reads the pressure transducer 62 between the blade 30 and nozzle exit port 37, to obtain the P1 and P2 readings from which it calculates the actual fuel flow and compares it with the fuel flow commanded. Then the fuel flow controller 16 reads the actuator position and thus the position or angle $\theta$ of the valve blade 30 and calculates what the new setting angle $\beta$ of such blade 30 should be (a smaller angle), to obtain the commanded increased flow rate, once the temporary drop in flow rate passes, upon gas pressure build-up in the gas generator, as described above.

The fuel flow controller 16 then takes another set of readings P1 and P2, calculates the new fuel flow and again compares it with the commanded fuel flow and adjusts the valve blade angle accordingly and repeats such cycle with further incoming fuel flow commands to close upon and follow same.

Note that generally the gas coming from the gas generator (and primary combustor) is but partially burned and carries with it unburned or partially burned fuel components as a hot gas through the choke valve 14 into the secondary combustor which is provided with one or more air ducts wherein air is mixed with the incoming hot gases to provide far more complete combustion thereof. The so-combusted gases are expelled from the secondary combustor providing thrust for the rocket engine to propel it at desired speeds as governed by the various fuel flow commands discussed above.

As noted above, the fuel flow initially drops when the valve blade is partially closed, in response to a command to increase the fuel flow therethrough. Conversely, when the fuel flow command is to decrease the fuel flow, the fuel flow controller 16 takes the above-listed readings and then commands the actuator to open or increase the angle of the valve gate which results in a temporary rise in fuel flow, which will pass when the pressure in the gas generator drops due to such increased outflow valve area. The above temporary valve flow increase in such example and the above temporary valve flow decrease, are known herein as temporary reverse changes in gas flow.

The fuel flow controller 16 of FIG. 1 includes the logic of FIG. 8. Thus the P2 command comes into the junction box 58 where it is compared with the P2 measured, to obtain the change of pressure required, plus or minus. Note that the P2 reading is another way of reading gas flow through a choke valve because choked gas flow is proportionate to the pressure P2 in such valve.

The above P2 differential is then fed to box 60, the P2 control compensation box. Such box also receives information from the volume estimate box 62 as to whether the gas generator is relatively full of fuel, which permits a fast response time or is relatively low on fuel, which requires a slower response time.

Governed by the above response time, the box 60 runs calculations to generate a P1 command that ignores the temporary reverse change of gas pressure above, that occurs in the hot gas valve 14 and sends a calculated P1 command to junction box 64 where it is compared with the P1 measured (in the gas generator) and the resulting P1 change or $\Delta$P1 is input to box 66 for processing. In box 66 the reading from box 62 is input relative to the volume of fuel remaining in the gas generator and a reading input from box 68 to box 66, relative to the P1 gain schedule of the gas generator, which readings determine the rate of change signal sent to the valve command, i.e., whether it shall pivot in, e.g. 1° increments, 5° increments or more or whether it shall pivot at short or long intervals to reach the desired setting. The above logic sequence is then repeated to more closely approach the P2 commanded or to follow changes in P2 commands.

The P1 gain schedule relates to the pressure in the gas generator. If the pressure be relatively high, the response to pressure change can be relatively fast while if the pressure be low, the response to pressure change up or down will be relatively slow.

All four boxes are algorithms, each box functioning by computer processing. The above block diagram or controller logic is but one example of the fuel flow controller 16 of FIG. 1 and other logic systems can be employed within the scope of the invention.

Figure 9:
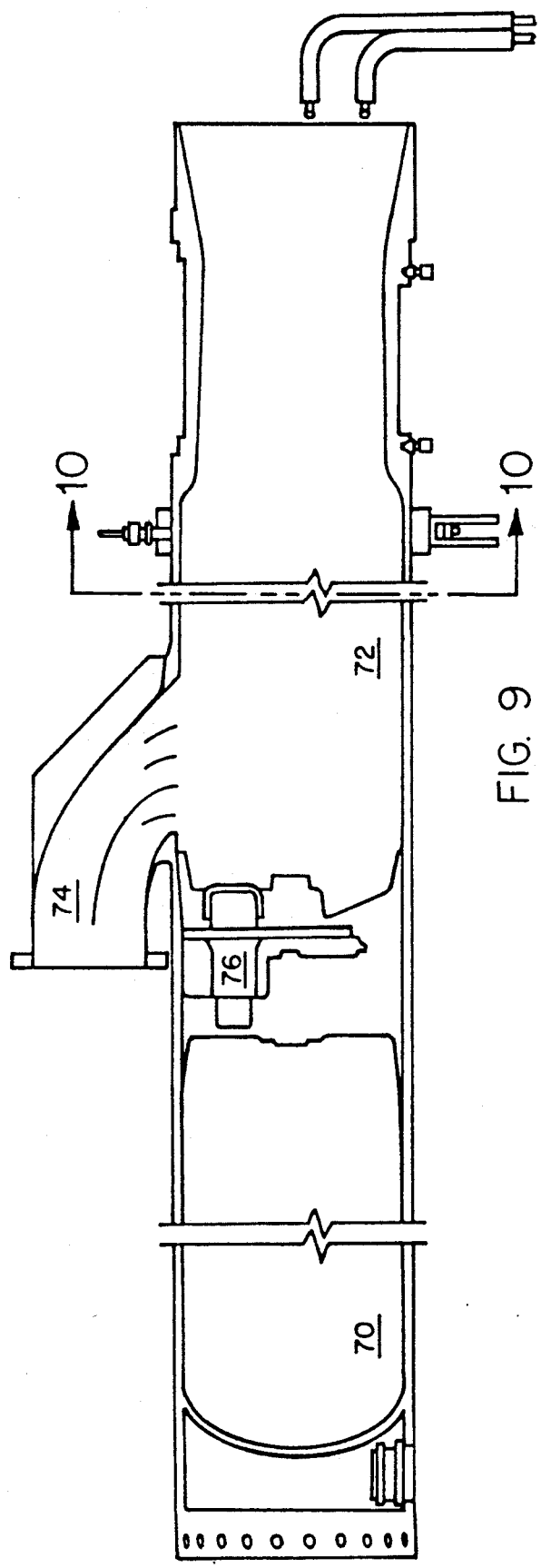
FIG. 9 is an elevation view, partly in section of a combined gas generator, hot gas valve and secondary combustor chamber in another embodiment of the invention taken on lines 9—9 of FIG. 10, looking in the direction of the arrows.
Figure 10:
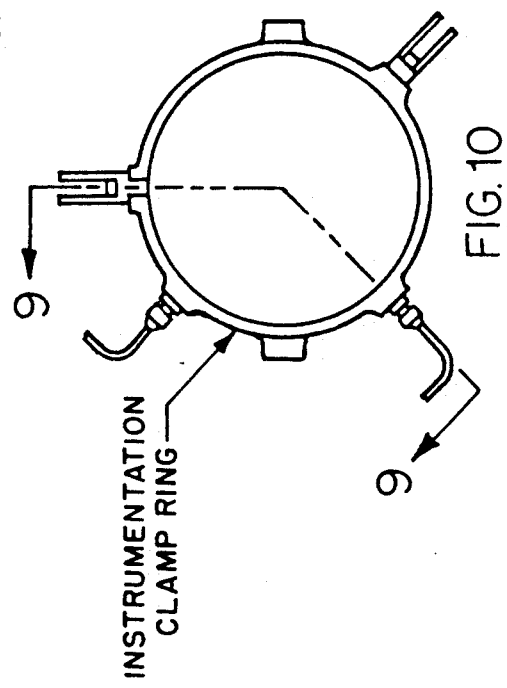
FIG. 10 is a cross-sectional elevation view of the combustor embodiment shown in FIG. 9 taken on lines 10-10 looking in the direction of the arrows and FIG. 11 is a graph showing the performance of the controlled hot gas valve of the present invention.

An example of a rocket engine for a variable flow ducted rocket (VFDR) is shown in FIG. 9 wherein such engine has gas generator and primary combustor 70 connects and communicates with secondary combustor 72 (with air inlet duct 74) by way of hot gas throttle valve 76, as shown in FIG. 9. The engine is generally tubular in cross section as indicated by section A—A through the secondary combustor of FIG. 9, as shown in FIG. 10.

The following example serves as an illustration of the controlled fuel flow system of the present invention and should not be construed in limitation thereof.

EXAMPLE I

Operating Characteristics

A gas generator, hot gas control valve and electronic fuel flow controller were integrated into a flight-type test unit. A series of development tests were conducted that included initially open-air tests to verify the variable flow gas generator system operation. Subsequently, the VFDR gas generator/hot gas valve/electronic control unit were integrated into a complete engine assembly, e.g. such as shown in FIG. 9 and hot test demonstration firings were conducted in open air. The results of such test firings are shown in the graph of FIG. 11.

Figure 11:
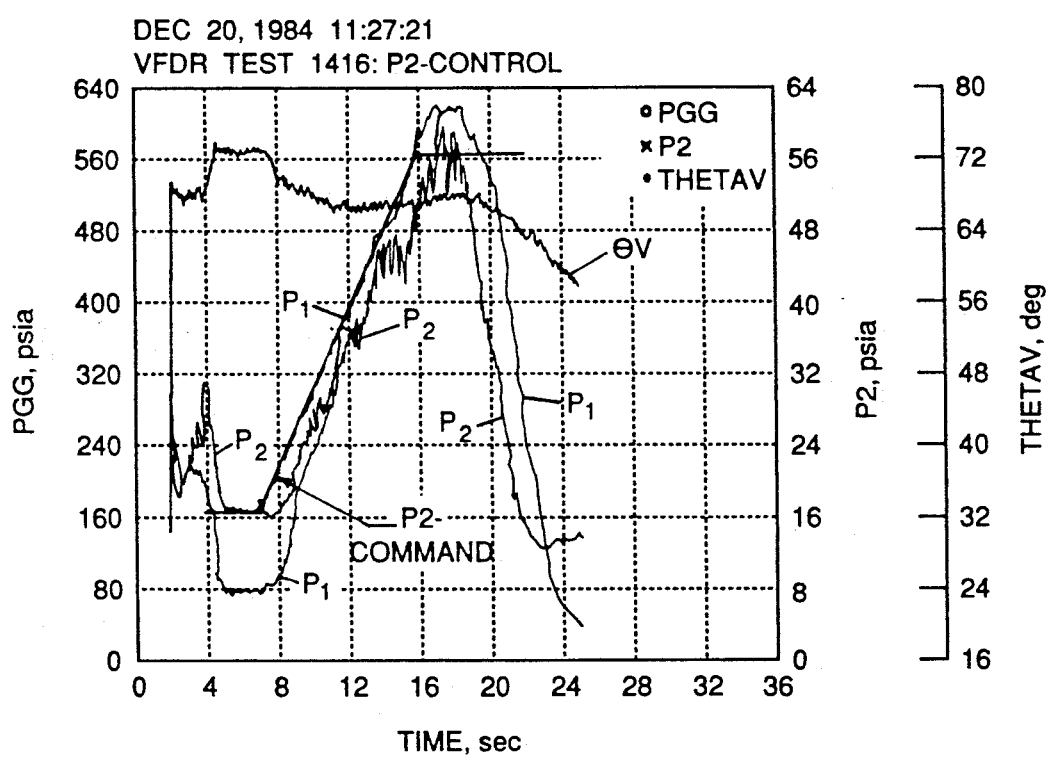

In FIG. 11 the angle of the valve blade, $\theta_v$, and the gas generator and fuel injector pressure, P1 and P2, are plotted against time. Similarly plotted is the P2 command line and the curves of P1 and P2 as shown. The so plotted test results show the excellent response of the VFDR gas generator to the commanded flow performance. During the 4–8 second time period, "reverse-flow" transient characteristics can be seen as the gas generator pressure $P_1$ initially decreases as the valve area is decreased (by decreasing the $\theta V$ angle) and then increases as the gas generator mass flow increases due to the increased propellant burning rate at increased pressure in the gas generator.

What is claimed is:

1. A controlled fuel flow system from gas generator to secondary combustor comprising, a valve mounted between said gas generator and said secondary combustor, said valve having a throat therethrough and a blockage element mounted in said valve and movable in said throat between relatively blocked and unblocked positions to control the gas flow therethrough, sensor means to read the gas pressure in said system upstream of said blockage element and downstream thereof, actuator means to position said blockage element between relatively blocked and unblocked settings and fuel flow controller logic to read said sensors and to operate said actuator and said blockage element to adjust the gas flow through said valve toward a desired rate and to repeat such read-adjust cycle.

2. The system of claim 1 wherein said gas generator is a solid fuel gas generator having a primary combustor therein and said secondary combustor is a ducted combustor.

3. The system of claim 1 wherein said blockage element is a blade which rotates in said throat.

4. The system of claim 3 wherein said throat downstream of said blade terminates in a discharge nozzle which feeds into said secondary combustor.

5. The system of claim 4 wherein a first pressure sensor is mounted in said gas generator and a second pressure sensor is mounted downstream of said blade in said throat and before said nozzle.

6. The system of claim 5 wherein said pressure sensors are pressure transducers.

7. The system of claim 1 wherein said fuel flow controller logic reads the first and second pressure sensors and compares same with a fuel flow command and reads the position of said blockage element in a four-step reading process and operates said actuator to position said blockage element to a desired setting and repeats the above read-adjust cycle to adjust said fuel flow rate toward the commanded fuel flow rate.

8. The system of claim 6 having fuel flow logic which reads a fuel flow command, the first and second pressure transducers, the actuator blade angle and rotates said blade to a desired setting and repeats such cycle to follow the commanded fuel flow.

9. The fuel flow system of claim 8 mounted in a variable flow ducted rocket.

10. The system of claim 9 wherein said actuator pivots said blade in the valve throat by way of a harmonic drive.

11. The system of claim 10 wherein said fuel flow controller logic pivots said blade to a smaller angle to increase the blockage of the valve throat to increase fuel flow therethrough and to pivot such blade in the reverse direction to decrease the gas flow therethrough.

12. The system of claim 11 wherein said logic includes valve pressure control compensation equations so as to ignore temporary pressure drops or pressure increases while changing the blade setting in the valve throat.

* * * * *